(12) United States Patent
Sapena Soler et al.

(10) Patent No.: US 11,973,881 B2
(45) Date of Patent: Apr. 30, 2024

(54) METHOD FOR SIGNING CONTRACTS

(71) Applicant: LLEIDANETWORKS SERVEIS TELEMATICS, S.A., Lleida (ES)

(72) Inventors: Francisco Jose Sapena Soler, Lleida (ES); Carolina Sola, Lleida (ES)

(73) Assignee: LLEIDANETWORKS SERVEIS TELEMÀTICS, S.A., Lleida (ES)

( * ) Notice: Subject to any disclaimer, the term of this patent is extended or adjusted under 35 U.S.C. 154(b) by 477 days.

(21) Appl. No.: 17/421,014

(22) PCT Filed: Jun. 2, 2020

(86) PCT No.: PCT/EP2020/065183
§ 371 (c)(1),
(2) Date: Jul. 6, 2021

(87) PCT Pub. No.: WO2021/008768
PCT Pub. Date: Jan. 21, 2021

(65) Prior Publication Data
US 2022/0103373 A1  Mar. 31, 2022

(30) Foreign Application Priority Data

Jul. 16, 2019 (EP) ..................................... 19382602

(51) Int. Cl.
*H04L 9/32* (2006.01)
*H04L 9/08* (2006.01)

(52) U.S. Cl.
CPC .......... *H04L 9/3247* (2013.01); *H04L 9/0861* (2013.01)

(58) Field of Classification Search
None
See application file for complete search history.

(56) References Cited

U.S. PATENT DOCUMENTS

2004/0111375 A1* 6/2004 Johnson ................. G06Q 20/40
  705/64
2006/0177061 A1  8/2006 Orsini et al.
(Continued)

OTHER PUBLICATIONS

Alzomai, M. and Jøsang, A., Sep. 2010, The mobile phone as a multi OTP device using trusted computing. In 2010 Fourth International Conference on Network and System Security (pp. 75-82). IEEE. (Year: 2010).*

(Continued)

*Primary Examiner* — Luu T Pham
*Assistant Examiner* — Edward X Long
(74) *Attorney, Agent, or Firm* — Hassan Abbas Shakir; Shakir Law PLLC

(57) ABSTRACT

A method for electronically signing contracts between at least a first and a second parties, the method including a first party accessing second party's website and fills in an on-line form with party personal data which is sent to a second party's server. The method of the inventions solves the problem of signing contracts between two parties, hence the object of the present invention is a computer implemented method that deals with the issue of protection against unauthorised use of data from within the employees of TTP companies and we present a solution in which a TTP company can certify the validity of a contract without having access to its content. In this way, the TTP minimizes the information it has access to and reduces the risks derived from such knowledge, like an eventual data leakage caused by some dishonest TTP employee.

3 Claims, 2 Drawing Sheets

(56) References Cited

U.S. PATENT DOCUMENTS

| | | |
|---|---|---|
| 2011/0231645 A1* | 9/2011 | Thomas .............. H04L 9/3236 713/150 |
| 2012/0255034 A1 | 4/2012 | Orsini et al. |
| 2012/0255035 A1 | 4/2012 | Orsini et al. |
| 2012/0159197 A1 | 6/2012 | Orsini et al. |
| 2012/0166815 A1 | 6/2012 | Orsini et al. |
| 2012/0226904 A1 | 6/2012 | Orsini et al. |
| 2012/0173883 A1 | 7/2012 | Orsini et al. |
| 2012/0221854 A1 | 8/2012 | Orsini et al. |
| 2012/0221855 A1 | 8/2012 | Orsini et al. |
| 2012/0221856 A1 | 8/2012 | Orsini et al. |
| 2012/0222134 A1 | 8/2012 | Orsini et al. |
| 2013/0275768 A1 | 10/2013 | Orsini et al. |
| 2013/0276074 A1 | 10/2013 | Orsini et al. |
| 2013/0283065 A1 | 10/2013 | Orsini et al. |
| 2014/0372770 A1 | 12/2014 | O'Hare et al. |
| 2015/0261973 A1 | 9/2015 | O'Hare et al. |
| 2015/0381582 A1 | 12/2015 | O'Hare et al. |
| 2016/0189147 A1* | 6/2016 | Vanczak ............. H04L 63/0838 705/71 |
| 2017/0244676 A1* | 8/2017 | Edwards ................ G06F 21/35 |
| 2018/0367509 A1 | 12/2018 | O'Hare et al. |

OTHER PUBLICATIONS

Kim, J.J. and Hong, S.P., 2011. A method of risk assessment for multi-factor authentication. Journal of Information Processing Systems, 7(1), pp. 187-198. (Year: 2011).*

International Search Report dated Aug. 12, 2020 issued by the European Patent Office for application PCT/EP/2020/065183, in English.

Written Opinion of the International Searching Authority uploaded to WIPO Patentscope dated Jan. 21, 2021 issued by the European Patent Office for application PCT/EP/2020/065183, in English.

Kremer S et al, "An intensive survey of fair non-repudiation protocols", Computer Communications, Elsevier Science Publishers BV, Amsterdam, NL, vol. 25, No. 17, Nov. 30, 2002 (Nov. 30, 2002), p. 1606-1621.

* cited by examiner

METHOD FOR SIGNING CONTRACTS

BACKGROUND

The development of computer networks and electronic communications in the last decades facilitated the proliferation of online commerce and electronic transactions. This kind of transactions usually require the signing of agreement or contract between the people involved in them. Thus, it is mandatory for business to care about the security of the information they exchange electronically, including confidentiality (data can only be accessed by authorised parties), integrity (maintenance of, and the assurance of the accuracy if data over its entire life-cycle), and availability (process of ensuring that data is available to end parties and applications, when and where they need it).

On-line contracts between a service provider and its customers are very common within the e-commerce context. Any type of legal document must be non-repudiable in the sense that the signing parts cannot deny having signed them. Non-repudiation can be achieved by means of digital signatures issued with certified keys. Unfortunately, the use of public key cryptography involves several technical issues leading it to be practical only for highly skilled citizens. For this reason, non-repudiability for on-line contracts is achieved by means of a party certifying the validity of contracts. This is the role of Trusted Third Parties (TTP) for on-line contracting.

TTP entities appeared to act as a certification authority in order to validate the transaction and ensure that any dispute that may arise between the parties can be solved in a fair way. For example, in a transaction between two or more persons or companies, the TTP certificates that the transaction was performed, the results of that transaction, the day and time, the names and information of the people or companies involved, and all the data contained. This certificate may be used as proof under penalty of perjury that the foregoing is true and correct.

Services of TTP entities are required for many companies today, such as banks, telephone companies or telemarketing. Among them, there are companies that require a high level of security for carrying out their transactions by also ensuring privacy for the storage of data associated to them.

Data privacy is a subject that comes worrying parties and companies, who are having to adapt to the new regulations and the requirements that their customers require. In order to guarantee the privacy of personal data, the European Union created the General Data Protection Regulation (GDPR). Such regulation was created precisely to ensure greater control and security of personal data. The GDPR extends the party right to choose how their data should be processed, as well as require that your data be erased and that it does not receive any type of notification or publicity. The regulation requires the customer to approve any and all future use of their data. The company cannot use the data of the client without his previous consent. GDPR guarantees the "Minimization Principle", the data collected by companies should be limited to what is necessary in relation to their purposes. That personal data is treated with an adequate level of security, including protection against unauthorized or unlawful processing.

The human factor is known to be a key issue in data security. A recent survey states that 52% of companies believe that the greatest risk come from inside, i.e., an oversight by an employee can put the company's investment at risk, while 46% of companies are afraid that their employees may lose devices, like notebooks and mobile phones, with access to internal information. This means that companies show a large tendency in investing in equipment and security software to avoid data leakage. The survey also indicates that, 44% of companies are afraid that their employees use technological resources in an inappropriate way. Such risks are larger among small businesses.

In the case of a TTP, its role is to certify the existence of an on-line contract which has been agreed by the signing parties at a given date. To do this, several secure protocols have been proposed in the literature to certify that an electronic transaction has taken up and this certification can be used as a proof in an eventual court. However, there is a lack of security, in terms of privacy, from the inside in TTP companies, that is hardly contemplated.

For TTPs, it is also important to assure that that no person, such an employee or employee, may have access to the personal data that pass through the servers of the TTP. Data could not be stored without being encrypted, and if possible, it should not be saved. Political communities have been working to develop norms and regulations that standardise these systems.

Few companies have the resources to prove to a judge, that the data signed by such party did not change after signature. There are cases of malicious customers who may tell the judge that the information was not offered when signing the contract. However, to avoid such cases, companies cannot assume as a prerequisite of the system that parties have knowledge about security or even encryption. However, we may consider that the worst attack in this environment is not the one coming from outside the network, trying to break protocols and firewall rules. We consider may as well consider that the worst attack to a TTP comes from the inside, i.e. people working at the TTP or with access to its systems, having access to the sensitive data such as personal data of parties. This paper considers the following hypothetical characteristics about TTP companies.

It is worth mentioning TTP employees, in many cases, may have access to the customers password. Sometimes the clients themselves say the password with the intention of helping in the resolution of an error and communications between client and companies is only controlled by firewall rules, few clients use VPN. More known problems are related to confidential information being stored in clear text in the database, illicit use of data, or recognition and abuse of consumer profiles, sending spam, selling information to other companies.

SUMMARY OF THE INVENTION

The object of the present invention is a computer implemented method that deals with the issue of protection against unauthorised use of data from within the employees of TTP companies and we present a solution in which a TTP company can certify the validity of a contract without having access to its content. In this way, the TTP minimizes the information it has access to and reduces the risks derived from such knowledge, like an eventual data leakage caused by some dishonest TTP employee. Our solution reduces the sensitive data managed by the TTP so that it can assure its clients that no confidential data will ever leak from its data system.

DESCRIPTION OF FIGURES

For a better understanding of the object of the invention, according to a preferred example of a practical embodiment thereof, a set of drawings is attached as an integral part of said description, wherein by way of illustration and not limitation, the following has been represented.

DETAILED DESCRIPTION

Figure 1:
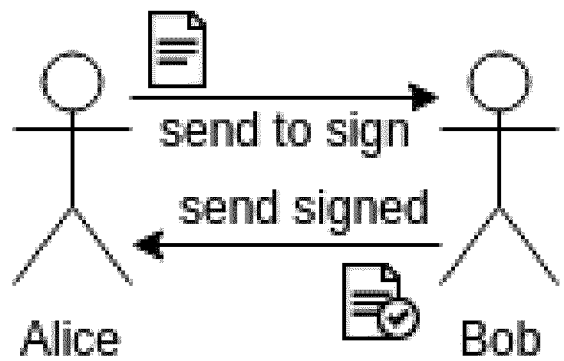
FIG. 1. Shows a diagram depicting typical contract signing process.
Figure 2:
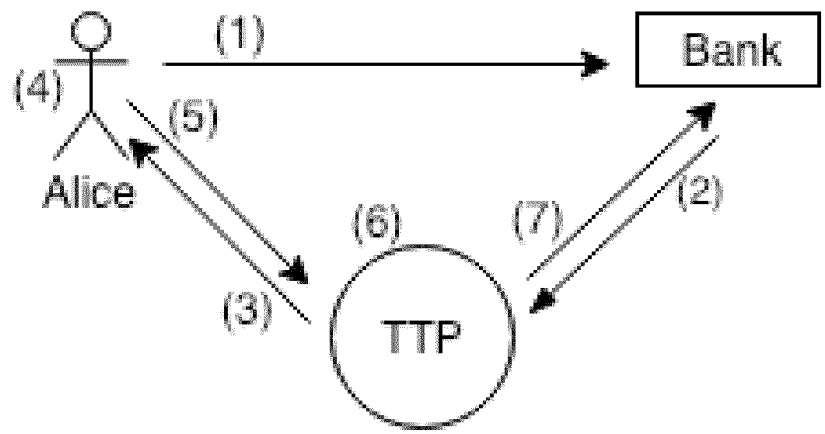
FIG. 2. Shows a diagram depicting a contract signing process involving a TTP direct intervention.
Figure 3:
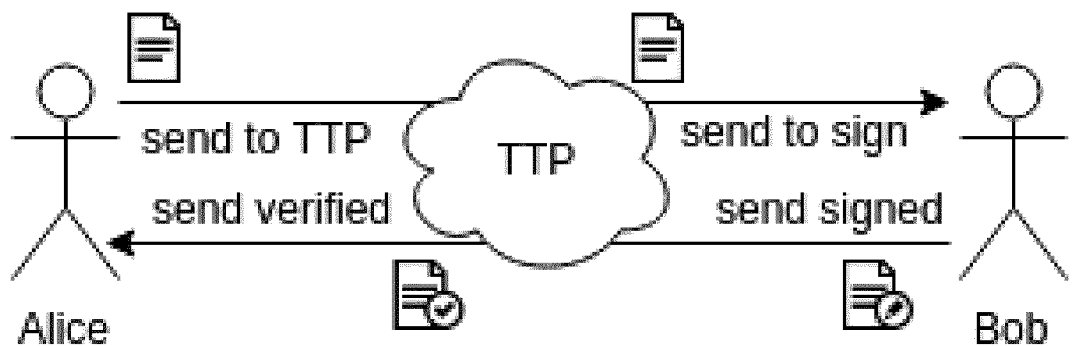
FIG. 3. Shows a diagram depicting a contract signing process involving a TTP non-direct intermediation.

We start from the situation where a first party, Alice in FIGS. 1 to 3, wants to send a contract to second party, Bob in FIGS. 1 and 2, who shall agree with its content. The information sent by Alice to Bob is confidential information. Two possible approaches that Alice can use to send the contract to Bob are hereby considered. FIG. 1 depicts a situation where Alice cannot show and prove to a Judge that this contract was signed by Bob. Steps in a classic situation: Alice, as the first party sends a contract to Bob as the second party. The first party just must at least perform some action to indicate his agreement with the content of the contract: click on a button, mark a checkbox, or draw a signature on a graphical web component; hence Bob is indeed agreed with the contract and sends the contract to Alice. In this situation, the problem appears when Bob repudiates the contract. Alice cannot prove the contents of the contract and cannot prove that Bob agreed the contract either. To solve this problem, Alice needs a trusted third party (TTP) that can guarantee the non-repudiation of Bob. This new scenario is depicted in FIG. 2 and explained as follows: Alice sends the contract to TTP, the TTP sends the contract to Bob, Bob agrees with the contract, Bob sends back the contract to the TTP, the TTP stores the contract with the timestamp, and then the TTP sends a contract to Alice.

FIG. 2 shows that Alice has the validation by TTP proving that the contract was signed by Bob and she can show this to a Judge as a proof. It is important to notice that Alice does not want any TTP employee to have access to this information. However, as you can see in the FIG. 2, an employee may have access to the information exchanged between the first and second parties, namely Alice and Bob.

FIG. 2 TTP situation, clearly shows more benefits than the FIG. 1 classic situation. The main benefit is that TTP can confirm the content of the contract and prove the timestamp when Bob agreed. However, such benefit generates a problem: the TTP has access to all information in the contract.

For Alice to choose a TTP, it is important that the company meets certain security requirements. It is common for customers like Alice to send information to the TTP in plain text and without any kind of encryption or security. TTP companies should ensure two main factors:

No employee has access to confidential data.
The information has not been tampered or manipulated, integrity.

In a paper-based situation, the paper contract should be signed personally; since it would only have some juridical validity if Alice and Bob took the contract to a notary's office. This would involve a third party responsible for recognising the signatures and the validity of the contract the notary; but those employees or co-employees of the notary would have access to all the information and documents.

In the method of the invention, using a digital TTP the contract is digitally signed, Alice and Bob and do not need to be physically in the same place at the same time. However, they need an entity, the notary in the case above, that judicially guarantees the validity of the entire process and that different from the office of the notary, which ensures that no unauthorised person has access to the information.

So, in this embodiment, Alice as the first party, is about to sign a contract with a Bank, the second party. The Bank then decides to use services provided by a TTP which attests about the agreements taken by the Bank and its customers. The internal employees of the TTP, including technical people who manage system servers, cannot be trusted, so that, they must not have access to the content of contracts. Let's consider a scenario of electronic contracting between a company and client. A Bank has a line of credit cards and makes an advertising campaign to advertise this product to the general public.

Alice, is aware of the offer rendered by the Bank, and decides to apply for a credit card through the Internet providing the data shown on the table below:

| Form Fields | Personal Documents | Contractual Clauses |
| --- | --- | --- |
| Name | Payslip | Interest Percentage |
| ID | Photo ID | Deadline Payment day |
| Address | Contract Job | Automatic Payment |
| Date of birth | Proof of residence | |
| Sex | Laboral life | |
| Nationality | | |
| Role | | |
| Company | | |

Following the diagram of FIG. 3 we find:
(1) On the Bank's Web site there is a form to enter Alice's personal data and data related to apply for a credit card. (confidential data). This data will be used to create the contract between Alice and the Bank.
(2) Then, the Bank sends the contract that was drafted from Alice's data to the TTP, through a secure channel using a Virtual Private Network (VPN), since the TTP should not be able to access the content of the contract.
(3) The TTP receives the contract and at least two pieces of information about the first party, Alice: her email address and her mobile phone number; being the minimum information needed by the TTP thus complying with the GDPR.
(4) TTP sends to Alice's email a link to a secure web site, where Alice may access the content of the contract and may, if needed, make changes to her personal data. This secure web site is hosted on TTP servers and only authorised employees could have access to said servers and no one should have access to Alice's agreement data with the Bank.
(5) Alice, when according to all the information you have seen, electronically signs the contract using a certificate or a digital signature or any similar procedure.
(6) Then, the TTP generates documentary evidence, with all the information regarding the communication between the Bank and Alice and includes a timestamp to said documentary evidence.
(7) Then, the TTP sends to the Bank the timestamped documentary evidence that guarantees that Alice has signed the contract with the information that was visualised accessed by her.

In order to so, the TTP has a public/private key pair, being the public key properly certified and shared with the Bank. The corresponding private key is kept secret by the TTP director and/or a very restricted set of highly trusted people inside the TTP. This private key, which allows to decrypt the contracts of TTP's customers should only be used if a Judge or some of the people involved in a given contract need access to it.

In an alternative embodiment of the invention and for the sake of security, it is possible to consider splitting the private key into several fragments kept by different persons. It will be at TTP's discretion and responsibility to securely store them.

When the first party, Alice, signs a contract with the second party, the Bank. The TTP will participate in the process as a party certifying that Alice agreed with the terms of the contract. As mentioned before, neither the TTP employees nor TTP system servers have access to the contract content.

Figure 4:
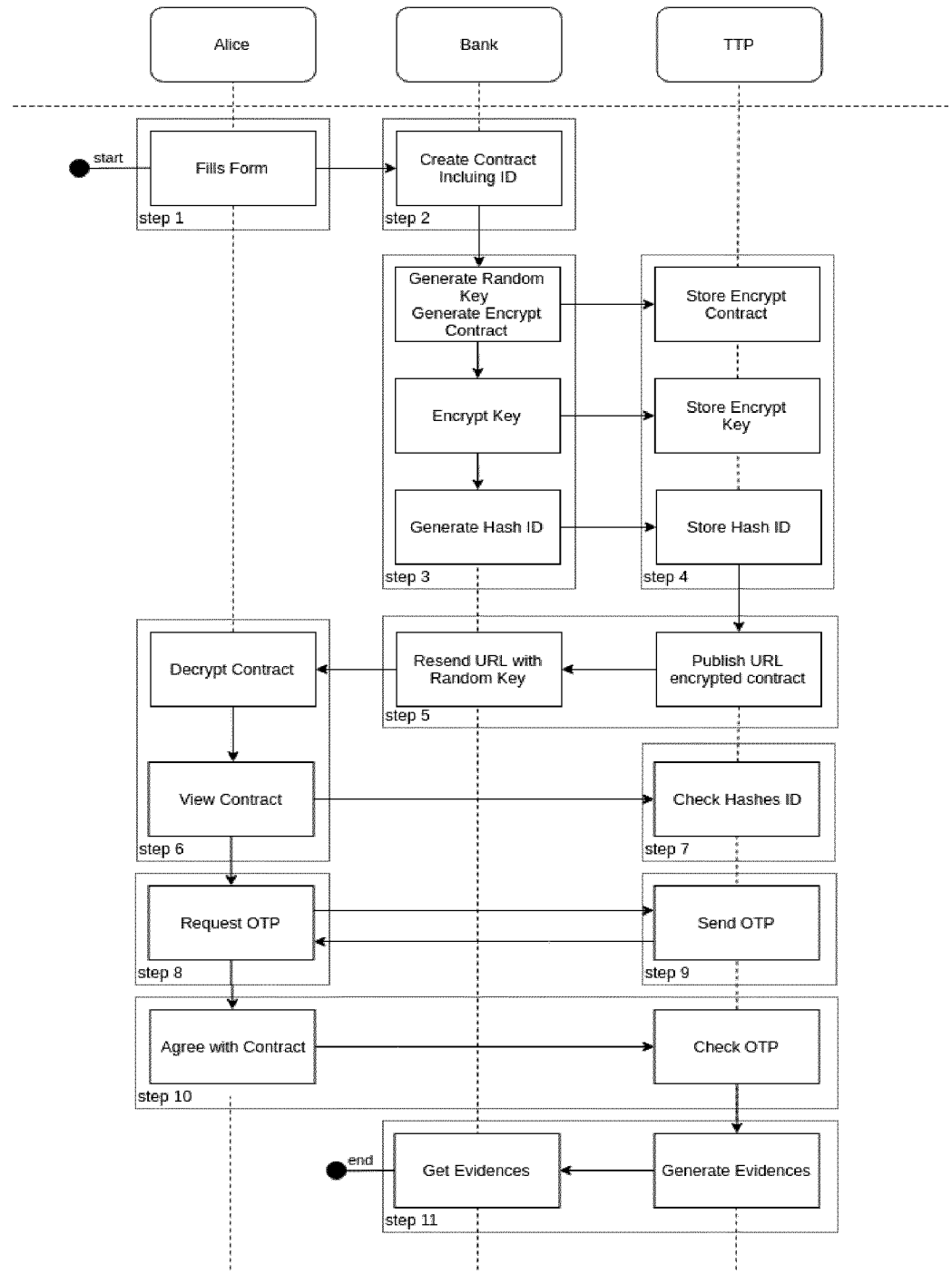
FIG. 4. Shows a flowchart of a preferred embodiment of the object of invention.

The whole process can be followed in the light of FIG. 4 showing:

Step 1: Data Form Filling

Alice, first party, accesses a second party webpage, in this case a Bank's website and fills in an online form with her personal data; personal data that is transferred to the Bank's server. The involved webpage being in the Bank's IP domain range.

Step 2: Contract Creation

At this stage, the Bank's server has compiled all the data provided by Alice together with the terms and conditions of the contract they are about to agree with in a document. During this process, the bank's server creates a unique random identifier (ID) which is included hidden inside the contract. As we will see next, this ID will be used as an evidence that Alice has had access to the contract text.

Step 3: Contract Encryption

After that, the Bank's server generates a random key for some symmetric key cryptosystem which is employed to encrypt the contract. This key is then encrypted under TTP's public key. The bank server then computes the hash digest H(ID) and then removes ID from its memory. The Bank's server then sends the encrypted contract, the encrypted key and the H(ID) to TTP.

Step 4: Store Encrypted Information

The TTP stores all the encrypted information send by the Bank. Note that the plain text of the contract is not available inside the TTP.

Step 5: Encrypted Contract Publication

The TTP then places the encrypted contract in a publicly accessible server and sends its URL to the Bank's server. The Bank's server then sends this URL and the random symmetric key to the first party, in this case Alice's web browser, and removes the mentioned symmetric key from the m Bank's server.

Step 6: Contract Opening

Alice's web browser downloads and decrypts, using the key generated in step 3, the contract and presents its content to Alice. Now, Alice can see the complete contract, including the terms and conditions in the browser.

Step 7: ID Verification

After the contract has been decrypted in the step 6, the ID inside it is sent to TTP. Upon its reception, the TTP will hash and compare it against the one previously stored by the TTP in step 4. If they do coincide, the TTP gets an evidence that the contract has been opened and viewed by Alice.

Step 8: OTP Request

In this moment, the TTP is sure Alice saw the contract. But, TTP needs to make sure that Alice is agrees with the contract. For this, will be Alice must enter her smart phone number or email in a form in her web browser which will then be received by the TTP.

The TTP sends an SMS or an email containing an OTP. The TTP will store the technical information about the transmission of such OTP. Alice may request and receive OTP by one personal way, email or mobile phone. Once she introduces and send the OTP the TTP it is understood Alice agreed the contract. So, Alice enters the received OTP indicating that she agrees with the contract. TTP will receive this OTP and check its correctness. Alice will be the one requesting the OTP; she will then choose to send it by SMS or email. The OTP is a random number between four and eight digits; the TTP is the entity generating the OTP and sending it to Alice.

Finally, the TTP compiles all the technical information and creates a certificate document which includes the encrypted contract, the encrypted key, the bank statement including the hashed ID, the received ID, the phone number or email the OTP was sent to, and the time in which the confirmation OTP was sent by Alice. All this information is timestamped and stored on the TTP's information system.

In a preferred embodiment of the invention, the form/s may be developed in HTML (Hypertext Mark-up Language). Data will be sent by POST through JavaScript to a server that will be responsible for compiling the personal data in the FDF (Forms Data Format) and converting them to PDF (Portable Document Format). Besides, a JavaScript code will be added to the PDF by FDF, that will be executed when opening the PDF, this code will be responsible for sending the ID generated to the TTP.

In a preferred embodiment of the invention, communication between at least the servers of second party, namely the Bank, and TTP are done through a VPN (Virtual Private Network). It provides secure and encrypted connections to provide greater privacy and security.

In the same moment the first party sends his/her personal data to the second party, a random code for use to encrypt the PDF will generated, this random code may be the key of the first party. This key under no circumstances can be sent to the TTP's server. In all the process this key must be allocated in a browser of the first party and may be stored in a HTTP (Hypertext Transfer Protocol) cookie or in the cache browser.

What is claimed is:

1. A method for electronically signing a contract between at least a first and a second party, the method comprising the first party filling in an online form associated with a second party's server, the method comprising:

performing, by the second party's server:
compiling personal data provided by the first party, together with terms and conditions of the contract,
creating a unique identifier (ID),
including the unique identifier (ID) in the contract,
generating a random key, generating an encrypted contract with the random key, and
encrypting the random key with a public key of a Trusted Third Party (TTP), thereby generating an encrypted random key,
computing a hash digest H(ID),
sending the encrypted contract, the encrypted random key and the hash digest H(ID) to the TTP;
placing, by the TTP, the encrypted contract in a publicly accessible server and sending a Uniform Resource Locator (URL) of the publicly accessible server to the second party's server;
sending, by the second party's server, the URL of the publicly accessible server and the random key to the first party;
decrypting, by the first party, the encrypted random key, decrypting, by the first party, the encrypted contract using the random key;

receiving, by the TTP, an identifier within the contract sent by the first party, hashing, by the TTP, the identifier, and comparing, by the TTP, the hashed identifier with the hash digest H(ID) stored by TTP, wherein a match between the hashed identifier and the hash digest H(ID) is evidence that the first party had accessed the contract;

generating, by the TTP, a one-time password (OTP) and sending, by the TTP, the OTP to the first party via email, Short Messaging Service (SMS), or mobile phone;

entering, by the first party, the received OTP indicating an agreement with the contract;

checking, by the TPP, the validity of the OTP entered by the first party;

creating, by the TPP, a certificate document comprising compiled technical information, including:

the encrypted contract, the encrypted random key, the hashed ID (H(ID)), the unique identifier (ID) of the first party, an email address or a phone number associated with transmission of the OTP, and a timestamp associated with the first party's entering of the OTP; and timestamping, by the TPP, the certificate document and storing the timestamped certificate document on the TTP's information system.

2. The method of claim 1, wherein the OTP is transmitted according to the phone number or the email address.

3. The method of claim 1, wherein the TTP is connected to the second party's server using a Virtual Private Network (VPN).

* * * * *